United States Patent [19]
Krozal

[11] 3,909,896
[45] Oct. 7, 1975

[54] CUTTING TOOL FOR PARTING OR GROOVING A WORKPIECE

[76] Inventor: William Krozal, 20498 Beaufait, Harper Woods, Mich. 48225

[22] Filed: May 2, 1974

[21] Appl. No.: 466,201

[52] U.S. Cl. ............................. 29/95 R; 82/1; 82/47
[51] Int. Cl.² ........................ B26D 1/00; B23B 3/00
[58] Field of Search .................... 82/1, 47; 29/95

[56] References Cited
UNITED STATES PATENTS
2,344,442  3/1944  Lvers ..................................... 29/95

OTHER PUBLICATIONS
Pamphlet–Cutting Off Tools–by J. Milton Lvers, 10 pages.
Article–Bearing Lands and Negative Rake–by Mark W. Purser, from American Machinist, Aug. 2, 1945, pgs. 118–121.
Article–Cutting Force–by Heinrich Heinmann, from The Tool Engineer, March 1960, pgs. 101–104.

Primary Examiner—Harrison L. Hinson
Attorney, Agent, or Firm—Whittemore, Hulbert & Belknap

[57] ABSTRACT

The cutting tool is of the general type utilized for parting or grooving a workpiece. Grooves are provided in the side surfaces of the cutting tool adjacent the cutting edge to alter the length of chip material to prevent build-up on the forward end of the cutting tool during a machining operation. Such alteration prevents seizing of the tool in a workpiece.

5 Claims, 4 Drawing Figures

U.S. Patent  Oct. 7, 1975  3,909,896
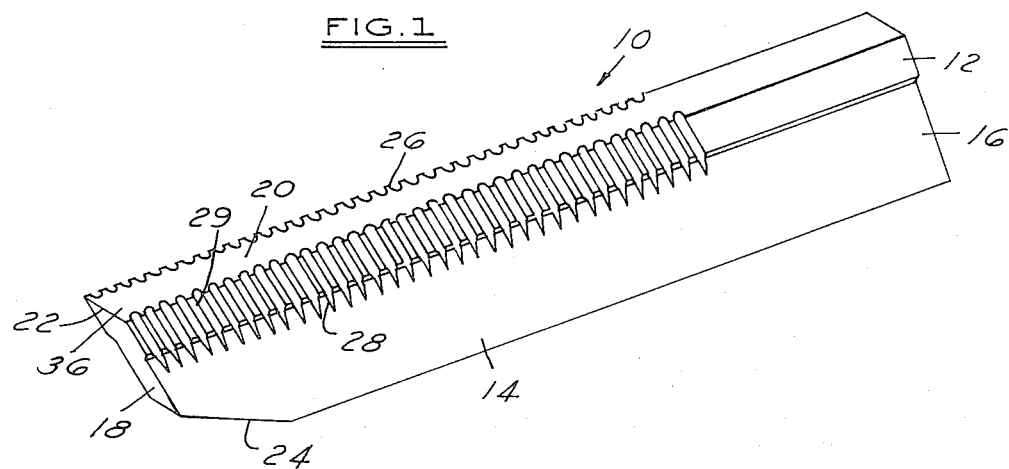
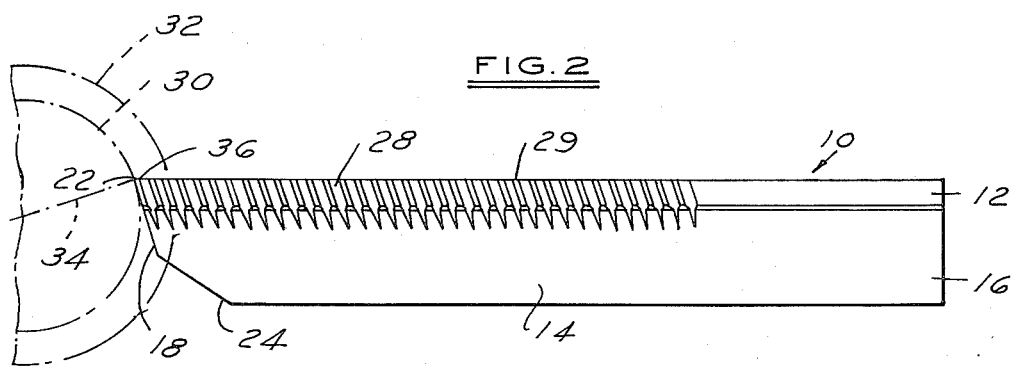
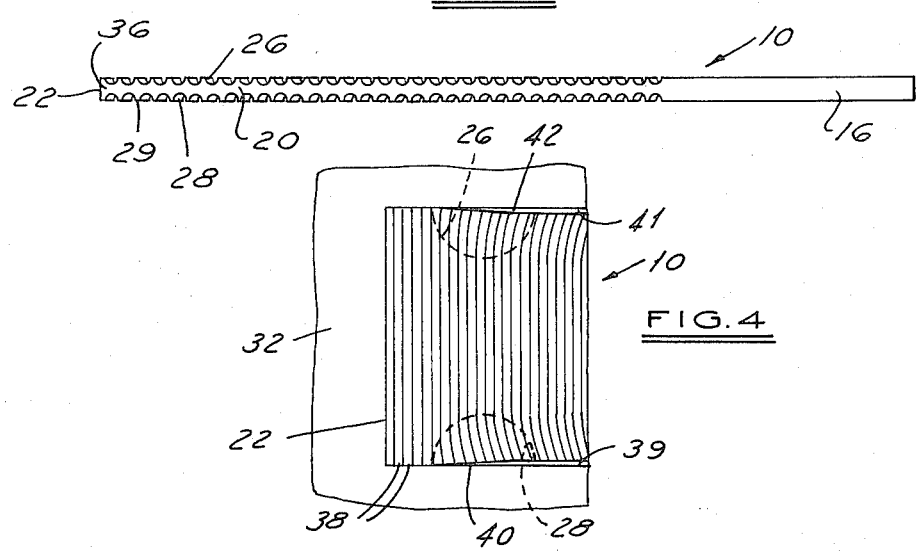

CUTTING TOOL FOR PARTING OR GROOVING A WORKPIECE

BACKGROUND OF THE INVENTION

Cutting tools of the general type considered in the present invention have been in use for a long time. Such cutting tools are, for example, utilized to part a section of machined stock from a section of unmachined stock. One of the most common examples of the use of such a tool is in a turret lathe wherein a relatively long piece of stock is machined on only one section, leaving the remaining portion of the stock in rough condition. The machined portion is severed from the unmachined portion by use of a cut-off or parting tool. Similarly, such tools are frequently used to provide peripheral grooves in a rotating workpiece as part of a machining operation on the workpiece.

One problem which has been encountered in connection with these tools has been seizing of the tool in the workpiece during the machining operation. The seizing results as a consequence of material building up on the forward tip of the tool. The chip material is actually strips scraped off the workpiece by the tool which are pressed together under heat and pressure to form a strip and having the appearance of being an integral strip of chip material, but which is actually a series of strips adhered together. This material normally forms a curl which is flung away from the workpiece. However, sometimes chip strips tend to adhere on the top of the tool. As this material builds up into a lump, it tends to be forced sidewardly as a result of machining pressures. A portion may work its way down along the side surfaces of the tool and adjacent surface of the workpiece and eventually may cause seizing of the tool in the workpiece. When this happens, the tool may be broken or damage may occur to the tool holding device or to the workpiece. Replacement of such tools, which are made from high cost special metal alloys, is relatively expensive. In accordance with the present invention grooves are provided along the side edges of the tool to alter the length of chip material and permit this material to escape without causing seizing of the tool in the workpiece.

SUMMARY OF THE INVENTION

The cutting tool is utilized for parting or grooving a workpiece. It includes a body which has an attacking surface, side surfaces extending therefrom and a forward surface. A cutting edge is defined by the juncture of the attacking surface and the forward surface. The body has at least one groove in at least one side surface extending from the attacking surface at a point adjacent the cutting edge. Preferably, such grooves are provided on both sides of the tool in general alignment and at least two spaced apart grooves are provided on each side of the tool. Additional grooves are provided to function as the tool is shortened as a result of sharpening. Further, the angle of the grooves is preferably substantially at right angles to the path of travel of the cutting edge to result in a smoother finished job.

IN THE DRAWINGS

FIG. 1 is a view in perspective of one embodiment of the cutting tool of the present invention;

FIG. 2 is a side elevational view of the tool of FIG. 1;

FIG. 3 is a top plan view of the tool of FIG. 1; and

FIG. 4 is a top plan view of the forward portion of the tool during a cutting operation enlarged and exaggerated for the purpose of illustration.

The cutting tool 10 may be utilized either as a grooving tool or as a parting or cut-off tool. The tool 10 is an elongated, relatively thin member and is fabricated of a metal alloy suitable for the particular stock to be worked upon. For example, carbon and carbon-vanadium tool steels, silico-manganese steel of medium carbon content, chrome-manganese-molybdenum steels, cobalt alloy steels and the like are of the type which may be utilized to fabricate the tool 10.

The upper marginal edge portion 12 of the tool has an enlarged thickness with respect to the lower portion 14. However, this particular configuration is not essential to the invention and tools having other geometric configurations may be utilized. The rearward end 16 of the tool is utilized for clamping in a tool holding fixture. The forward end of the tool performs the actual cutting operation. As will be noted, the forwardmost end surface 18 has a reverse angle to form a relief. This is necessary to prevent heeling of the tool during the cutting action. The surface 18 and upper attach surface 20 together define the cutting edge 22. A secondary relief surface 24 is provided in the lower forward corner of the tool.

A plurality of spaced apart grooves 26, 28 are provided on either side of the tool 10 and extend from the attack surface 20 downwardly and rearwardly with respect to the front end of the tool. Material 29 is left between the grooves. This material is utilized as the actual cutting portion of the tool. In operation of the tool, only the forwardmost grooves are functional. The grooves provided therebehind function as the tool is shortened as the result of sharpening and resharpening the cutting end thereof. It will be noted that the grooves 26, 28 are not provided on the rearward end 16. This is because this portion of the tool is discarded when the tool becomes short as this portion is utilized for clamping the tool in a tool holder.

The grooves 26, 28 are preferably reverse angled and basically at the same angle as the relief surface 18 so that the grooves will be substantially tangential to the surface being cut as, for example, the surface 30 of workpiece 32, illustrated in dotted lines in FIG. 2. The angle of the grooves should be substantially at right angles to the path of motion of the cutting edge 22, illustrated by dotted line 34. This angulation of the grooves is preferred because it results in improved smoothness of the sides of the groove being cut into the workpiece 32. Other angulations may be, however, utilized within the scope of the invention.

As previously mentioned, the function of the grooves 26, 28 is to aid in chip removal during the machining operation. Chips normally form in relatively large curls or pieces which fall or are flung away from the rotating workpiece. However, a certain portion of the chip material may build up on the forward end surface portion 36 of the tool. A small lump of material may form on the surface 36 and will adhere thereto. As this lump builds up, the resultant machining pressure tends to cause the material to press against the surfaces of the workpiece and also flow around the sides of the tool. This frequently results in the tool seizing in the workpiece causing breakage of the tool. The provision of the forwardmost grooves 26, 28 provides means for altering the length of the chip material for escape of this material without causing seizing. While one groove at the forward end of the tool minimizes such seizing, it is preferred that at least two of such grooves be provided because there is still a small build-up when only one groove is utilized. Similarly, it is preferred that aligned grooves be provided on each side of the tool 10 rather than on one side only because the provision of two aligned grooves results in superior balance and smooth chip removal.

The method for altering the length of the chip material may best be understood by reference to FIG. 4. The chip material is actually removed from the workpiece as separate strips 38. The tool 10 functions to scrape the metal off as opposed to slicing it off. The strips 38 are immediately pressed together under heat and pressure by interaction of the workpiece and tool to form a strip having the appearance of being an integral strip of chip material but which is actually a series of strips 38 adhered together.

Sometimes the strips 38 tend to adhere together and form a lump on the forward end surface portion of the tool. Factors tending to cause this to occur are related to the nature of the metal being machined and the speed of machining. Such lumping may also occur randomly. Its basic cause is failure of the strips 38 to slide out of the groove being cut as a consequence of frictional resistance applied to the underside of the strips by the tool surface and the ends of the strips 38 which abut the adjacent surfaces of the workpiece. Once a lump forms, it tends to expand against the adjacent surfaces 39, 41 of the workpiece, resulting in jamming of the tool 10 in the workpiece.

The provision of grooves 26, 28 closely adjacent the cutting edge 22 results in altering the length of the chip material so that it can be forced out of the work area without causing seizing of the tool 10.

As will be noted in FIG. 4, as the strips 38 initially are formed, they press against the preceding strip adhering thereto and driving the entire mass of strips rearwardly. This rearward progress is retarded by the friction offered by the tool surface and work surfaces. When the strips reach the grooves 26, 28, the friction caused by the tool surface is reduced to only the surface portion between the grooves. The end portions of the strips over the grooves do not encounter any frictional resistance. This causes the end portions of the strips to bend in the direction of travel as illustrated at 40, 42, thus reducing the length thereof. The ends of the strips are thereby removed from contact with the adjacent surfaces of the workpiece, thereby preventing jamming of chip material between the tool and workpiece causing seizing of the tool. Some of the chip material may also flow into the grooves and be sliced off by the edges of the grooves to further relieve congestion.

The dimensions of the grooves and the land material 29 between the grooves is important. If the land material 29 is too wide, formation of lumps may occur before the strips 38 reach the grooves. If the grooves are not wide or deep enough, they may not be effective in preventing seizing of the tool. The minimum width and depth of the grooves should be about 0.005 inch, while the maximum width of the land portion between grooves should be about 0.250 inch.

In use of the tool 10, the tool will, of course, need frequent resharpening. The tool may be resharpened until the forwardmost material 29 is ground away and the section defined by the forwardmost groove is reached. At this time, the tool must be ground until the next section of material 29 is reached because the tool material in the area of the grooves would not function properly as a cutting edge, it being appreciated that this material would be narrower than a normal cutting edge and further that there would be no grooves to service a cutting edge provided in this area.

What I claim as my invention is:

1. A cutting tool for parting or grooving a workpiece including a body having an attacking surface, side surfaces extending therefrom, and a forward surface, a cutting edge defined by the juncture of the attacking surface and the forward surface, said body having at least one groove in each side surface extending from the attacking surface at a point adjacent the cutting edge, said groove having a width and depth of about at least 0.005 inch and being spaced from the cutting edge no more than about 0.250 inch.

2. A cutting tool as defined in claim 1, further characterized in that at least two of said grooves are provided on the same side surface in spaced apart relationship.

3. A cutting tool as defined in claim 1, further characterized in that said grooves are angled reversely with respect to the forward surface at an angle substantially at right angles to the intended path of the cutting edge into a workpiece.

4. A cutting tool as defined in claim 1, further characterized in the provision of a plurality of spaced apart grooves in each side surface extending in spaced apart relationship from the forward surface.

5. The method for parting or grooving a workpiece comprising the steps of engaging the cutting edge of the workpiece with a tool, scraping portions off the workpiece with the cutting edge as narrow strips which force preceding strips along a surface of the tool away from the workpiece, providing at least one groove in each side surface of the tool, orienting the tool with respect to the workpiece so that said grooves are at substantially right angles to the path of the cutting edge into the workpiece, relieving friction at the outer edges of said tool surface at a point adjacent the cutting edge by means of said grooves whereby the outer end portions of the strips over said friction relief will bend in the direction of travel of said strips to thereby reduce the length of said strips.

* * * * *